US012578775B2

(12) United States Patent (10) Patent No.: US 12,578,775 B2
Zhou et al. (45) Date of Patent: Mar. 17, 2026

(54) HIGH-BANDWIDTH POWER ESTIMATOR

(71) Applicant: SambaNova Systems, Inc., Palo Alto, CA (US)

(72) Inventors: Junwei Zhou, Sunnyvale, CA (US); Youngmoon Choi, Milpitas, CA (US); Jinuk Shin, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 112 days.

(21) Appl. No.: 18/676,855

(22) Filed: May 29, 2024

(65) Prior Publication Data

US 2024/0310893 A1 Sep. 19, 2024

Related U.S. Application Data

(63) Continuation of application No. 18/089,891, filed on Dec. 28, 2022, now Pat. No. 12,072,748.

(60) Provisional application No. 63/294,781, filed on Dec. 29, 2021.

(51) Int. Cl.
  *G06F 11/30* (2006.01)
  *G06F 1/28* (2006.01)
  *G06F 9/445* (2018.01)
  *G06F 1/30* (2006.01)
  *G06F 1/3203* (2019.01)

(52) U.S. Cl.
  CPC ............ *G06F 1/28* (2013.01); *G06F 9/44505* (2013.01); *G06F 1/30* (2013.01); *G06F 1/3203* (2013.01)

(58) Field of Classification Search
  CPC ........ G06F 1/28; G06F 9/44505; G06F 1/324; G06F 1/3243; G06F 1/3296; G06N 3/063

USPC .......................................................... 713/340
See application file for complete search history.

(56) References Cited

U.S. PATENT DOCUMENTS

| | | | |
|---|---|---|---|
| 2012/0011370 A1 | 1/2012 | Duke | |
| 2012/0113703 A1* | 5/2012 | Gyllenhammer | G11C 15/00 |
| | | | 365/49.17 |
| 2016/0378168 A1* | 12/2016 | Branover | G06F 1/3203 |
| | | | 713/323 |
| 2019/0028104 A1* | 1/2019 | Wang | G06F 30/34 |
| 2019/0303743 A1* | 10/2019 | Venkataramani | G06N 3/063 |
| 2021/0073169 A1* | 3/2021 | Wang | G06N 3/063 |
| (Continued) | | | |

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Volvick Derose
(74) *Attorney, Agent, or Firm* — FP Patents; Sikander M. Khan; Bruce A. Young

(57) ABSTRACT

An integrated circuit (IC) comprises an array of power base units (PBUs) organized in rows and columns. The IC further includes an array-level power accumulator that includes a power estimation unit (PEU) and two or more column power accumulators (CPAs) coupled with the PEU and the PBUs via dedicated wiring. Additionally, a power clock management controller (PCMC) is linked to the array-level power accumulator. Notably, some CPAs are connected to the array-level power accumulator through dedicated wiring.

7 Claims, 11 Drawing Sheets

- Array with Power Information Network

(56) References Cited

U.S. PATENT DOCUMENTS

| | | | |
|---|---|---|---|
| 2021/0173893 A1* | 6/2021 | Luo | G06F 17/16 |
| 2021/0174174 A1* | 6/2021 | Zhu | G06F 15/17318 |
| 2021/0200286 A1* | 7/2021 | Chaouat | G04F 10/005 |
| 2023/0205293 A1* | 6/2023 | Zhou | G06F 1/3243 |
| | | | 713/340 |
| 2023/0385019 A1* | 11/2023 | Livingston | A63F 9/24 |
| 2023/0385138 A1* | 11/2023 | Kansal | H04L 1/1806 |
| 2024/0020261 A1* | 1/2024 | Jordan | G06F 13/4068 |
| 2024/0056082 A1* | 2/2024 | Lin | H03K 3/037 |
| 2024/0056960 A1* | 2/2024 | Axmon | H04W 48/20 |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al., A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

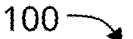

```
┌──────────────────────────────────────────────┐
│                                              │
│          ┌──────────────────────┐            │
│          │      Compiler        │            │
│          │        160           │            │
│          └──────────────────────┘            │
│                     │                        │
│                     ▼                        │
│         ╱──────────────────────╲             │
│        ╱     Configuration       ╲           │
│       ╱       file 165            ╲          │
│      ╱──────────────────────────╲           │
│                     │                        │
│                     ▼                        │
│          ┌──────────────────────┐            │
│          │   Runtime processes  │            │
│          │        170           │            │
│          └──────────────────────┘            │
│                                              │
└──────────────────────────────────────────────┘
```

```
┌─────────────────────────────────────────────────────────────────┐
│  Coarse-grained reconfigurable (CGR) processor 110               │
│                                        130                        │
│  ┌──────────┐     ┌──────────┐         (                         │
│  │  Host    │◄───►│  I/O I/F │◄──┐              ┌──────────────┐  │
│  │  180     │     │   138    │   │ Top-         │  CGR array   │  │
│  └──────────┘     └──────────┘   │ level        │ (array of    │  │
│        185                        │ network      │ CGR units)   │  │
│                                   │ TLN   ───►   │ with         │  │
│  ┌──────────┐     ┌──────────┐   │              │ array-level  │  │
│  │ Memory   │◄───►│Memory I/F│◄──┘              │ network      │  │
│  │  190     │     │   139    │                  │ (ALN)        │  │
│  └──────────┘     └──────────┘                  │   120        │  │
│        195                                      └──────────────┘  │
└─────────────────────────────────────────────────────────────────┘
```

FIG. 1 – System

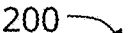
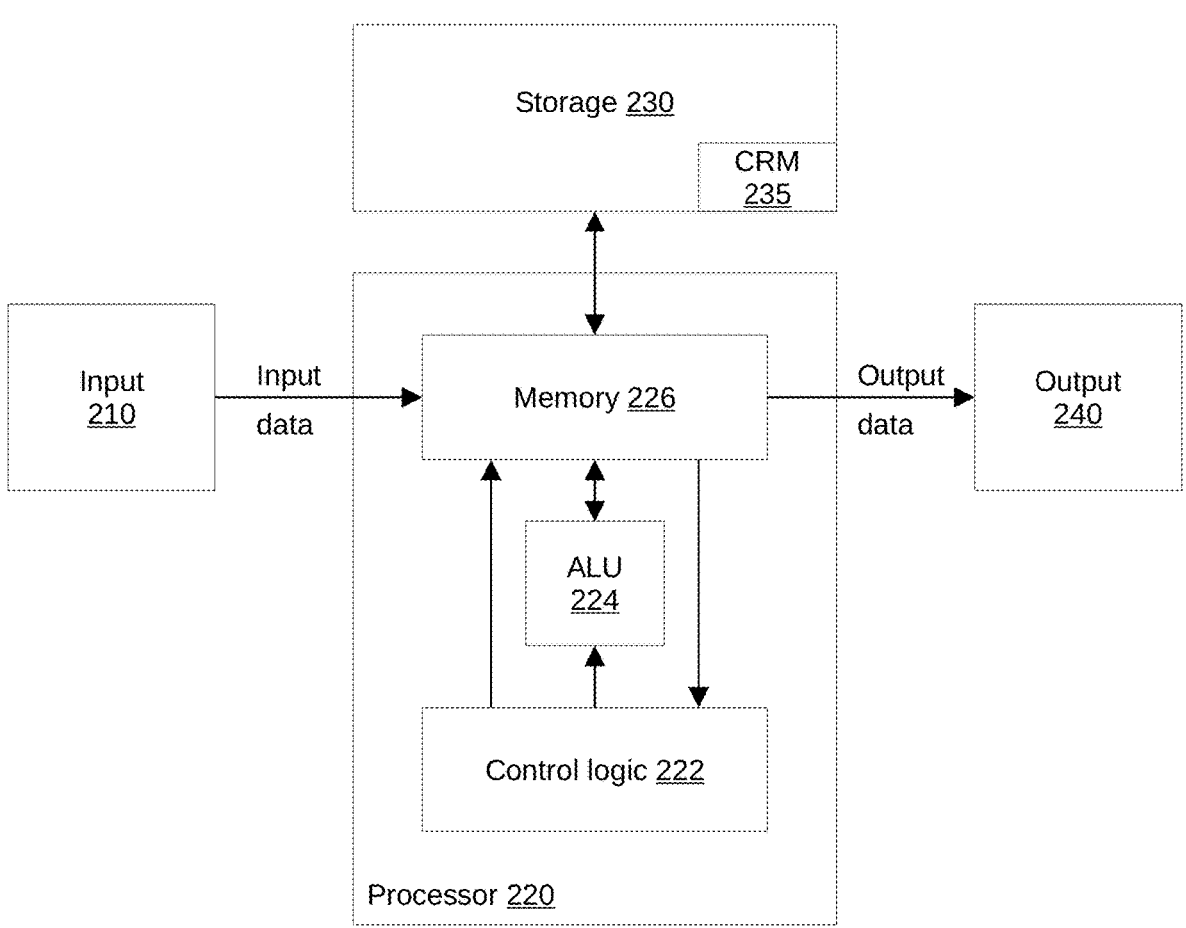
FIG. 2 – Computer

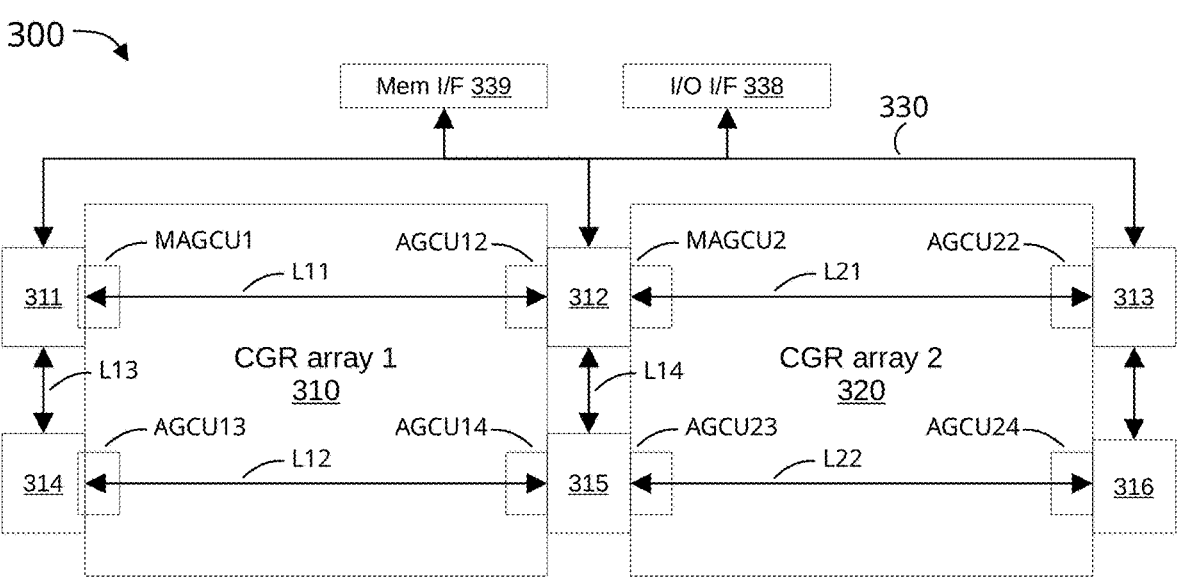
FIG. 3 – CGR Architecture
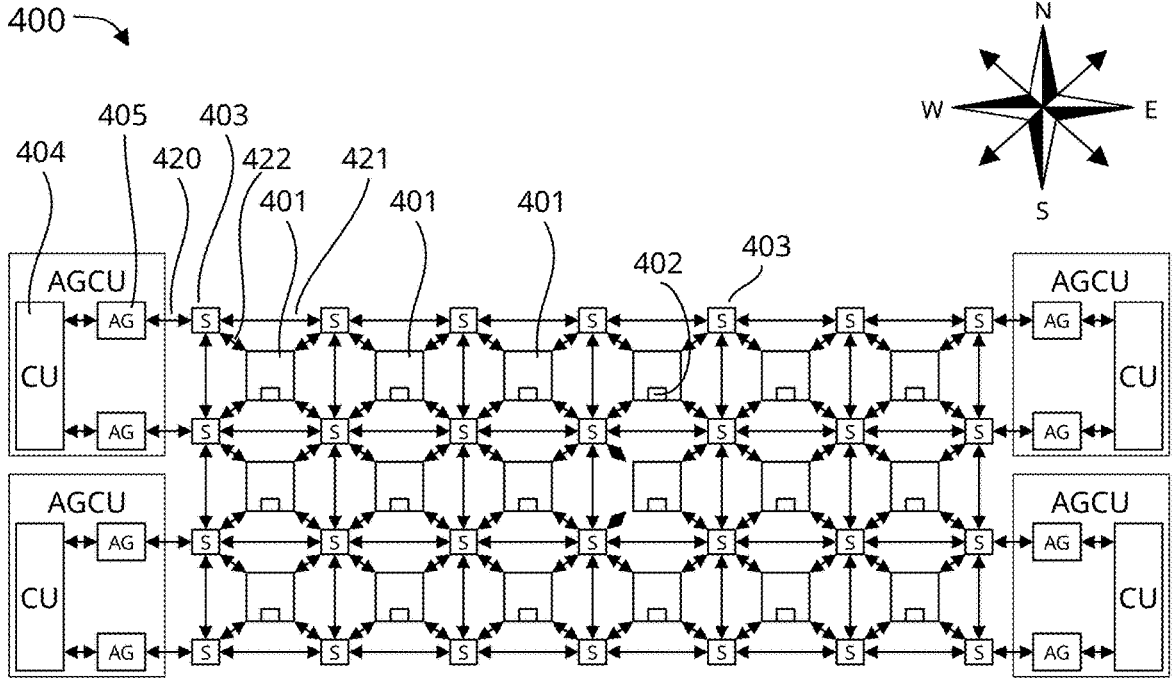
FIG. 4 – CGR Array

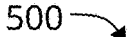
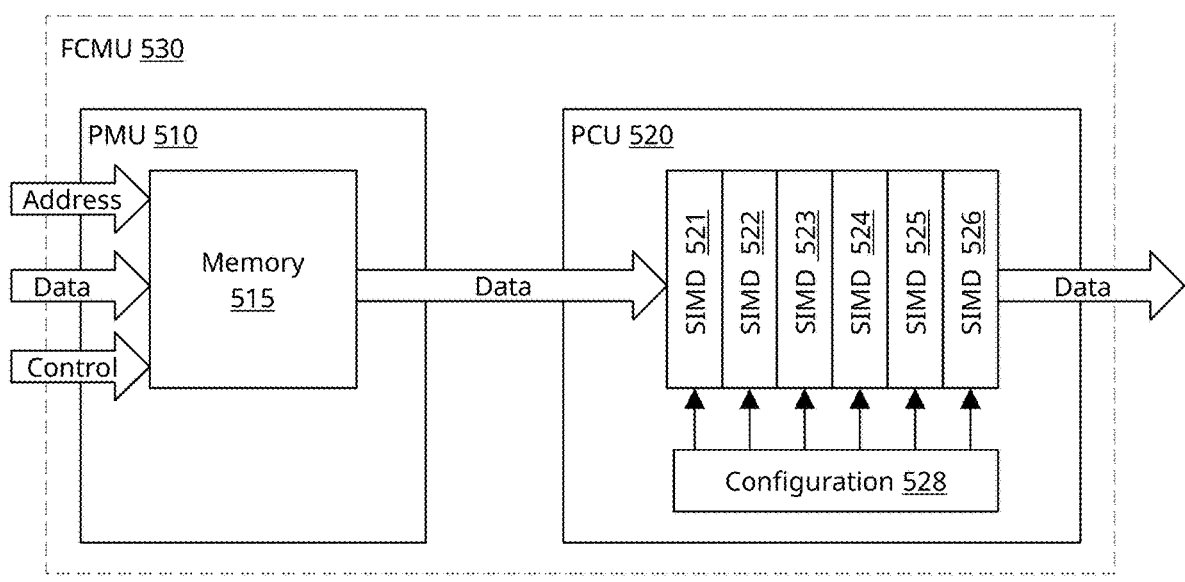
FIG. 5 – PMU and PCU

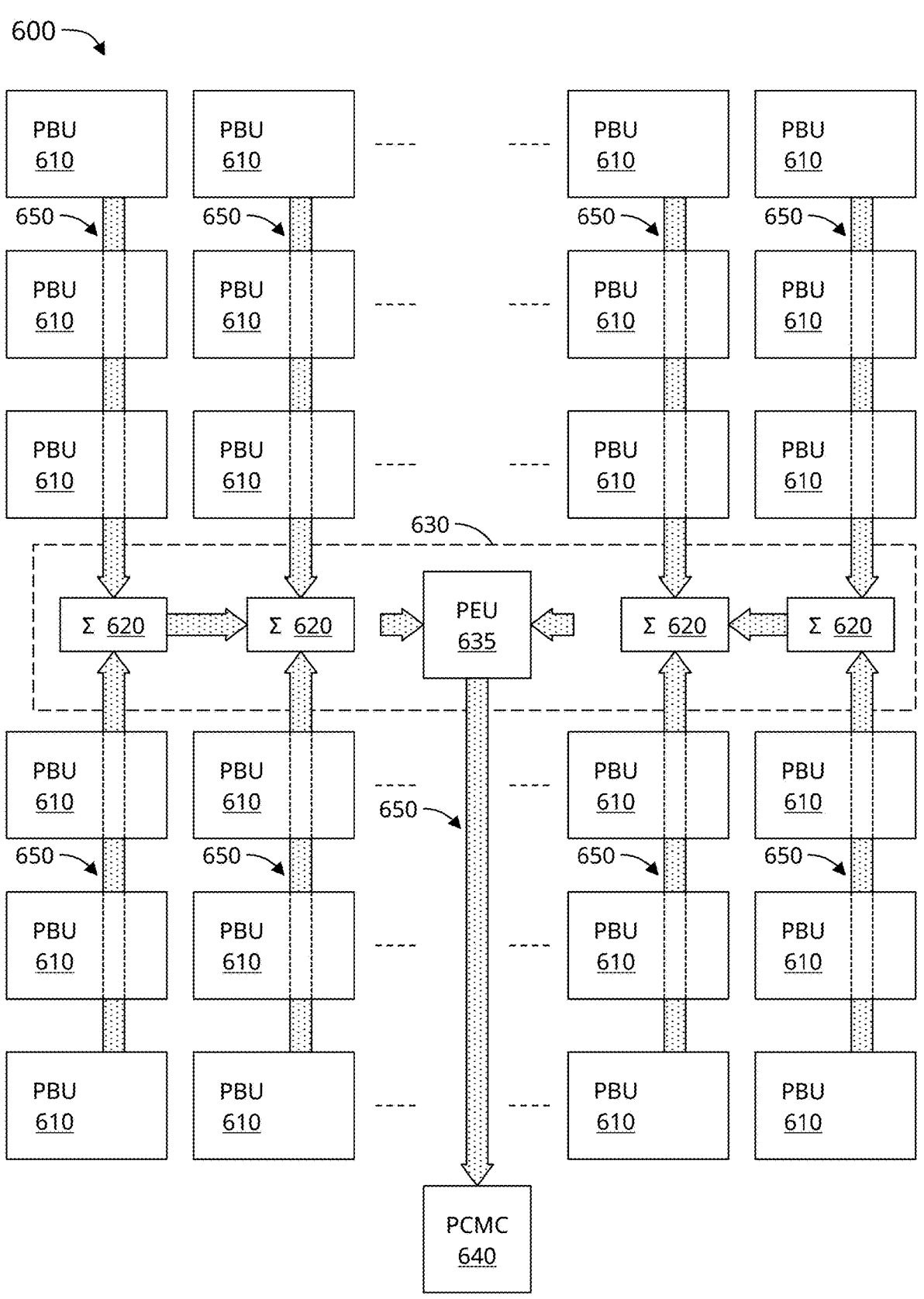
FIG. 6 – Array with Power Information Network

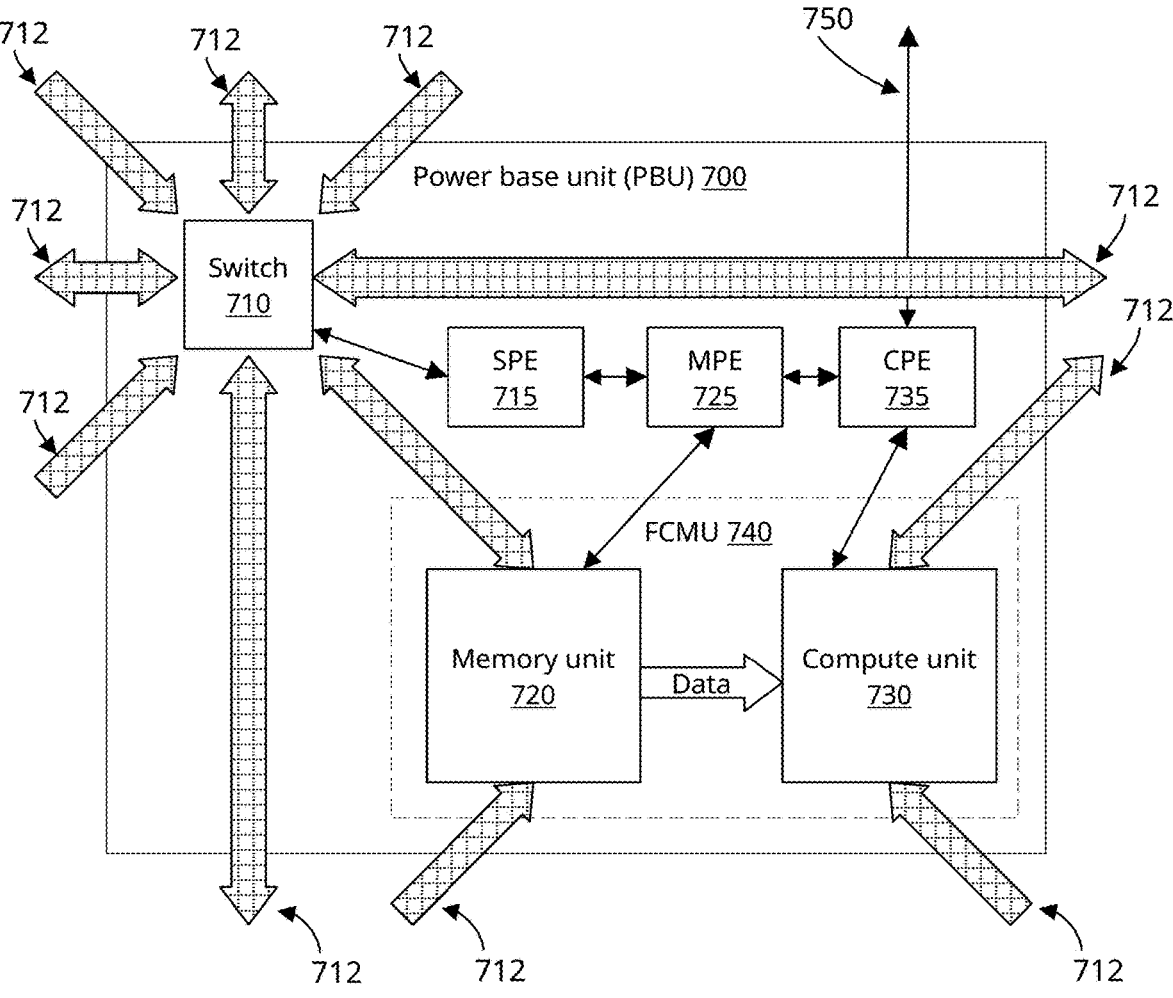
FIG. 7 – PBU

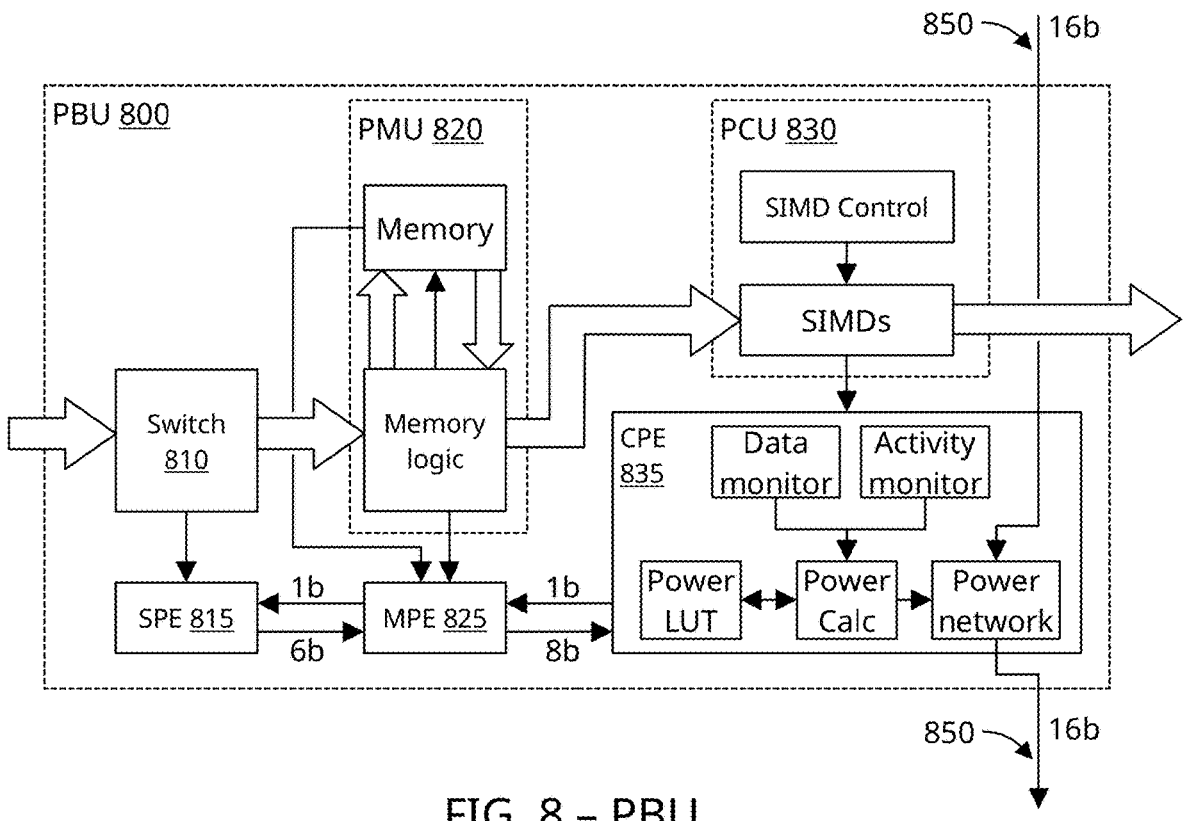
FIG. 8 – PBU

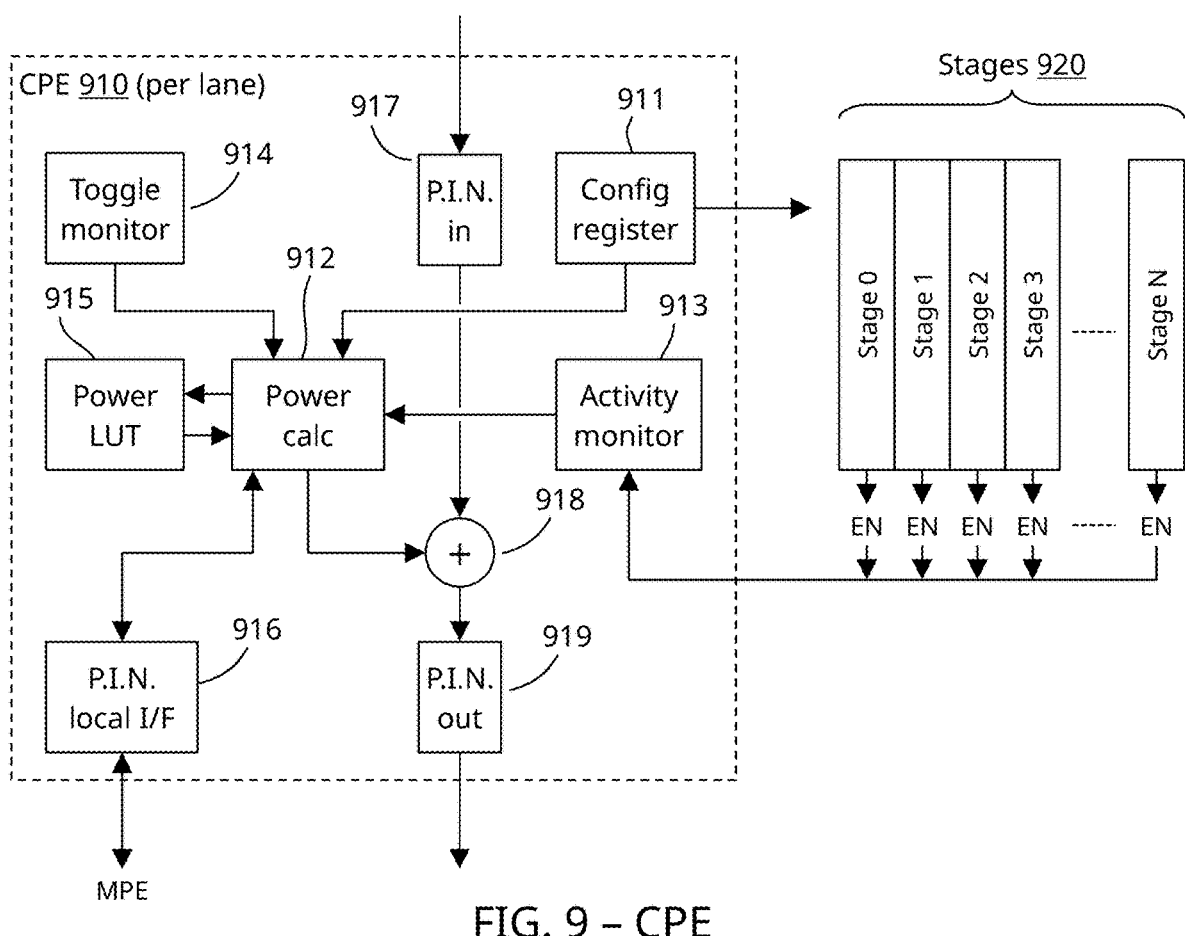
FIG. 9 – CPE

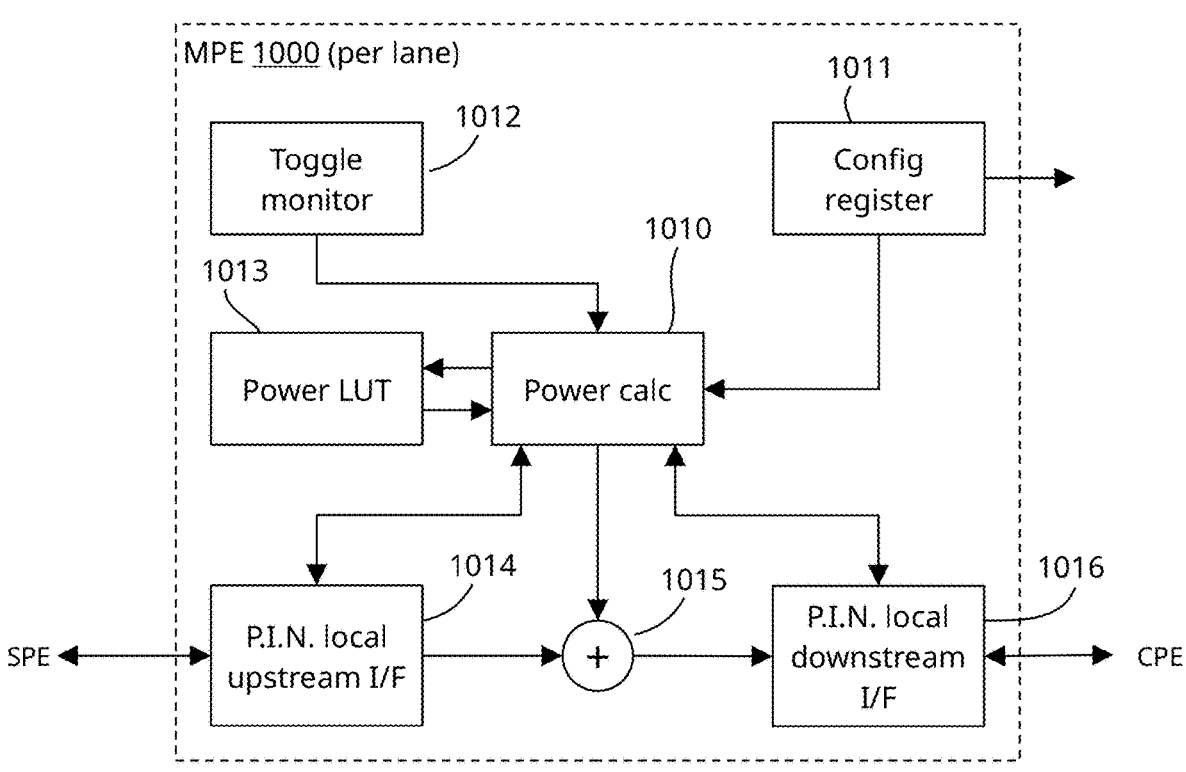
FIG. 10 – MPE
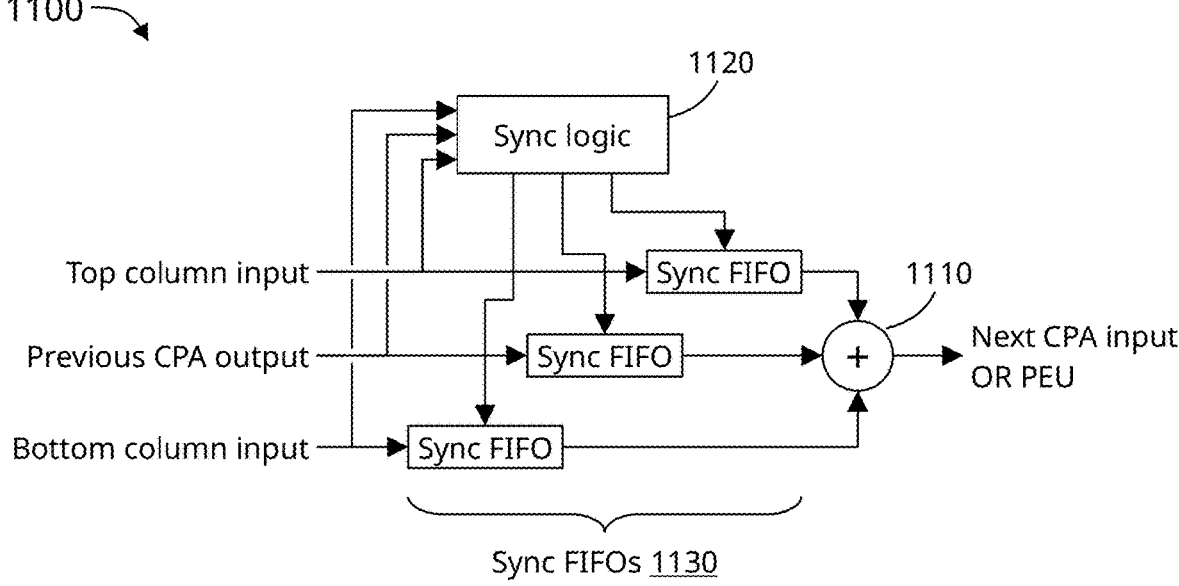
FIG. 11 – CPA

1200
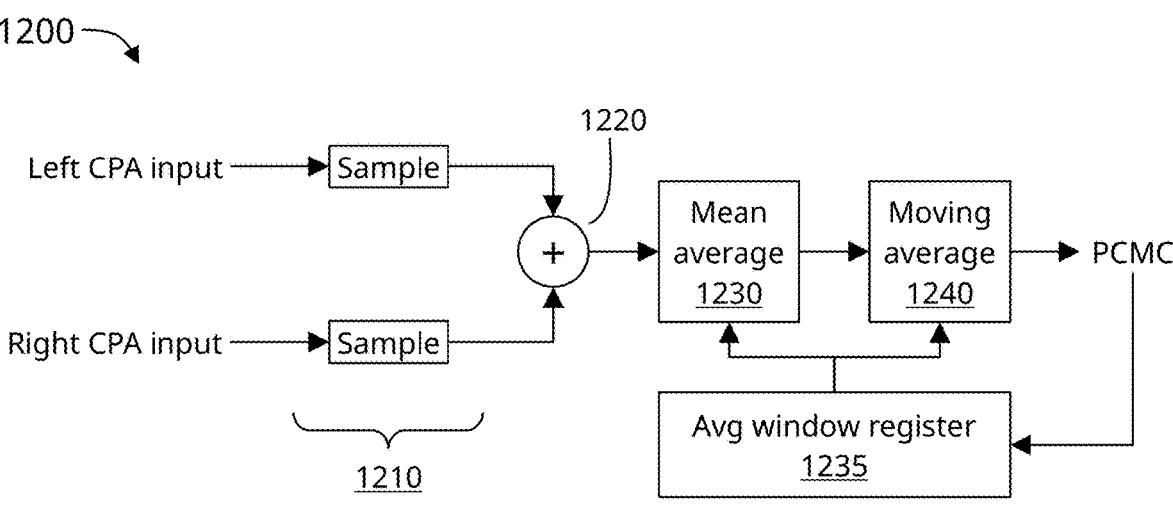
FIG. 12 – PEU
1300
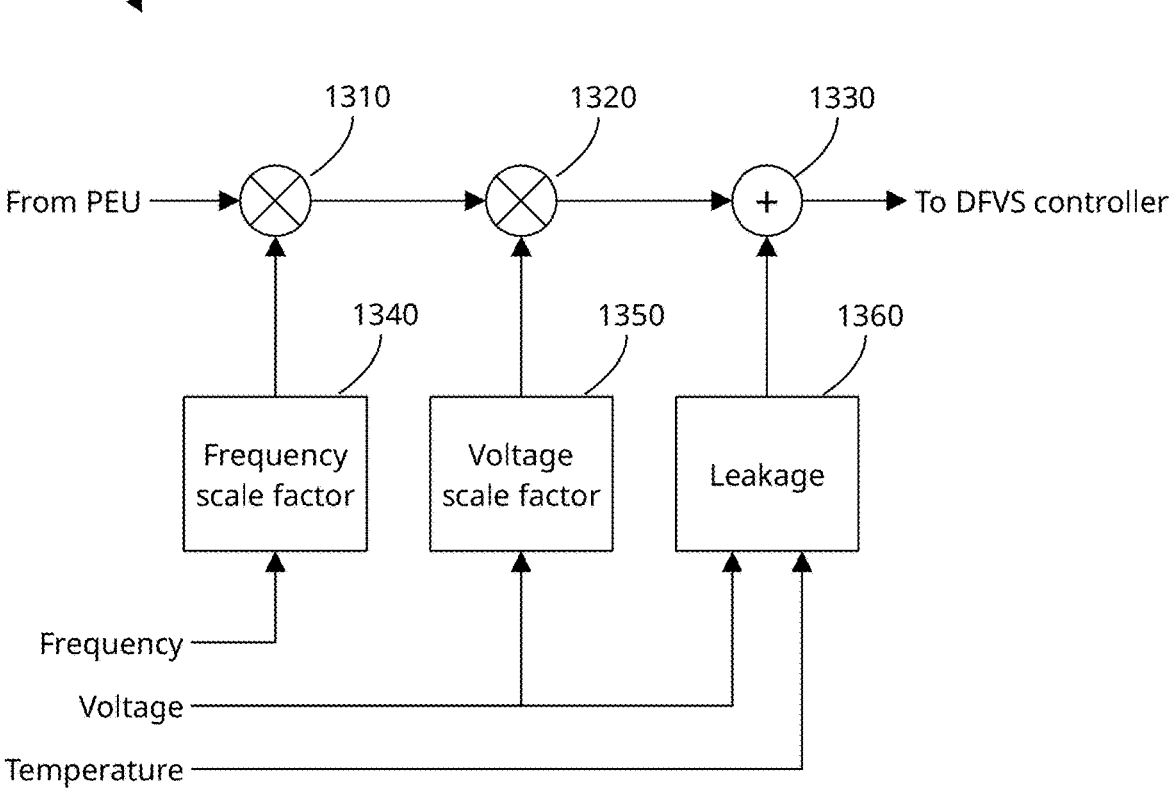
FIG. 13 – PCMC

Figure 14:
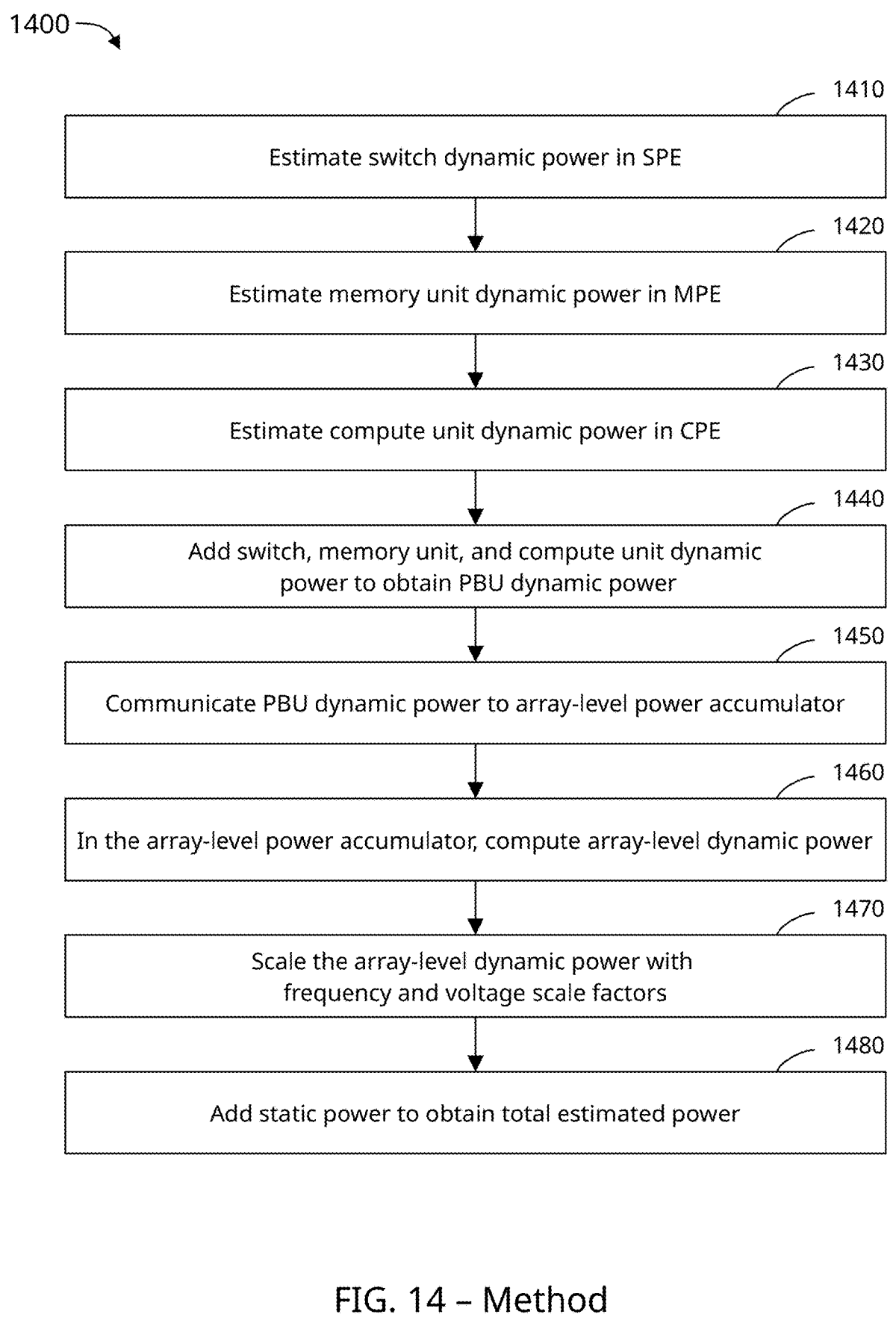

1400

1410

Estimate switch dynamic power in SPE

1420

Estimate memory unit dynamic power in MPE

1430

Estimate compute unit dynamic power in CPE

1440

Add switch, memory unit, and compute unit dynamic
power to obtain PBU dynamic power

1450

Communicate PBU dynamic power to array-level power accumulator

1460

In the array-level power accumulator, compute array-level dynamic power

1470

Scale the array-level dynamic power with
frequency and voltage scale factors

1480

Add static power to obtain total estimated power

FIG. 14 – Method

HIGH-BANDWIDTH POWER ESTIMATOR

CROSS-REFERENCES AND INCORPORATIONS

This application is a continuation of U.S. patent application Ser. No. 18/089,891, entitled "High-Bandwidth Power Estimator for AI Accelerator," filed on Dec. 28, 2022.

This application claims the benefit of U.S. provisional patent application No. 63/294,781, entitled, "High-Bandwidth Power Estimator for AI Accelerator," filed on 29 Dec. 2021. The provisional application is hereby incorporated by reference for all purposes.

The following are incorporated by reference for all purposes:

Prabhakar et al., "Plasticine: A Reconfigurable Architecture for Parallel Patterns," *ISCA '17*, Jun. 24-28, 2017, Toronto, ON, Canada; and Koeplinger et al., "Spatial: A Language and Compiler for Application Accelerators," *Proceedings of the 39th ACM SIGPLAN Conference on Programming Language Design and Implementation* (PLDI), Proceedings of the 43rd International Symposium on Computer Architecture, 2018.

BACKGROUND

Technical Field

The technology disclosed relates to performance and power optimization in processor integrated circuits (ICs). In particular, it relates to estimating and predicting power in machine learning (ML) and artificial intelligence (AI) processor chips to enable proactive power management rather than reactive power management.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Increasing performance in ML/AI processors brings significant challenges for thermal and electrical design of a full stack-hardware design that includes both the chip and the system in which the chip is used. Until now, on-chip power management has been reactive. Traditional designs depend on thermal sensor and/or current sensor readings, which take in the order of milliseconds to measure and respond. During this time, a system can become unreliable, unless it has relatively large margin, reducing its performance.

BRIEF DESCRIPTION OF THE DRAWINGS

The technology will be described with reference to the drawings, in which:

FIG. 1 illustrates an example system including a coarse-grained reconfigurable (CGR) processor, a host, and a memory.

FIG. 2 illustrates an example of a computer, including an input device, a processor, a storage device, and an output device.

FIG. 3 illustrates example details of a CGR architecture including a top-level network (TLN) and two CGR arrays.

FIG. 4 illustrates an example CGR array, including an array of CGR units in an array-level network (ALN).

FIG. 5 illustrates an example of a pattern memory unit (PMU) and a pattern compute unit (PCU), which may be combined in a fused-control memory unit (FCMU).

FIG. 6 illustrates an example architecture with a distributed power information network.

FIG. 7 illustrates an example power base unit (PBU).

FIG. 8 illustrates details of a power base unit implementation.

FIG. 9 illustrates details of an example compute power estimator (CPE) for nominal dynamic power estimation in a PCU.

FIG. 10 illustrates details of an example memory power estimator (MPE) for nominal dynamic power estimation in an MPU.

FIG. 11 illustrates details of an example column power accumulator (CPA).

FIG. 12 illustrates details of an example power estimator unit (PEU) that determines the array-level nominal dynamic power estimate.

FIG. 13 illustrates details of an example power clock management controller (PCMC) that determines array-level total power estimate.

FIG. 14 illustrates an example method of estimating power dissipation in an array of compute units.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

Increasing performance in machine learning and artificial intelligence processors brings significant challenges for thermal and electrical design of a full stack-hardware design that includes both the chip and the system in which the chip is used. Until now, on-chip power management has been reactive. Traditional designs depend on thermal sensor and/or current sensor readings, which take in the order of milliseconds to measure and respond. During this time, a system can become unreliable, unless it has relatively large margin, reducing its performance. Therefore, a faster way of engaging power management is needed to maximize power-constrained performance and reliable system operation.

The problem doesn't start when the chip is in operation. Even during the IC's design, and the system design, accurate power predictions are needed and not always available. The ability to emulate the design and obtain a credible estimate of its power usage aids in physically implementing the chip, potentially improving its performance and power dissipation, and reducing its manufacturing cost. The technology disclosed herein provides such systems and methods, accelerating power management by several orders of magnitude over conventional systems.

An integrated circuit may include an array of compute units, each paired with a memory unit, and a switch to connect the compute units and the memory units with an array-level network. The compute units, memory units, and switches may operate from substantially the same supply voltage, and from the same clock, or from clocks operating at clock frequencies that are in a fixed proportion to each other. The die temperature may be substantially constant over the die (although not necessarily over time) due to the high thermal conductivity of silicon. The clock frequency and supply voltage may be controlled by a dynamic frequency and voltage scaling controller to operate the chip within electrical and thermal limits of the system. When the array's performance must be maximized, the clock frequency must be as high as the supply voltage permits. When the array's power must be minimized, the voltage must be as low as the clock frequency permits for sufficient performance. Spikes in power usage can be very short, and conventional analog measurement and processing can be too slow or may not have sufficient bandwidth.

The disclosed technology resolves this by pairing each switch with a switch power estimator (SPE), each memory unit with a memory power estimator (MPE), and each compute unit with a compute power estimator (CPE). The resulting combination of a switch, memory unit, compute unit, SPE, MPE, and CPE is called a power base unit (PBU). Thus, the array level network connects an array of PBUs. The SPE, MPE, and CPE estimate the nominal dynamic power usage for the switch, memory unit, and compute unit, based on a nominal clock frequency and a nominal supply voltage. Each PBU digitally communicates, via dedicated wiring such as an array-level power information network, its total estimated nominal dynamic power usage to an array-level power accumulator, for example included in a power estimation unit (PEU). The use of dedicated wiring for the power information means that wires can be used very efficiently, and that the speed (bandwidth) of the power information network can be very high. Implementations add timestamps to estimates to achieve maximum granularity and accuracy of the estimates. The PEU may filter the received power estimates, for example in a mean average and a moving average, and determine the array-level estimated nominal dynamic power usage.

A power clock management controller (PCMC) receives the array-level estimated nominal dynamic power from the PEU and scales it with frequency and voltage scale factors that are based on the actual clock frequency and measured supply voltage to obtain an estimated actual dynamic power. It also estimates static power (leakage) for the array based on the measured supply voltage and the die temperature. The PCMC adds the dynamic power and static power estimates to obtain a total estimated power.

Terminology

As used herein, the phrase "one of" should be interpreted to mean exactly one of the listed items. For example, the phrase "one of A, B, and C" should be interpreted to mean any of: only A, only B, or only C.

As used herein, the phrases "at least one of" and "one or more of" should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives "first", "second", "third", etc., to describe an object, merely refers to different instances or classes of the object and does not imply any ranking or sequence.

The following terms or acronyms used herein are defined at least in part as follows:

"AGCU"—address generator (AG) and coalescing unit (CU).

"AI"—artificial intelligence.

"AIR"—arithmetic or algebraic intermediate representation.

"ALN"—array-level network.

"Buffer"—an intermediate storage of data.

"CGR"—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

"CGRA"—coarse-grained reconfigurable architecture. A data processor architecture that includes one or more arrays (CGR arrays) of CGR units.

"CGR Array"—an array of CGR units, coupled with each other through an array-level network ("ALN"), and coupled with external elements via a top-level network (TLN). A CGR array can physically implement the nodes and edges of a dataflow graph.

"CGR unit"—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

"CPA"—column power accumulator.

"Compiler"—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.

"Computation graph"—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

"CPE"—Compute power estimator.

"CU"—coalescing unit.

"Data Flow Graph"—a computation graph that includes one or more loops that may be nested, and wherein nodes can send messages to nodes in earlier layers to control the dataflow between the layers.

"Datapath"—a collection of functional units that perform data processing operations. The functional units may include memory, multiplexers, ALUs, SIMDs, multipliers, registers, buses, etc.

"FCMU"—fused compute and memory unit—a circuit that includes both a memory unit and a compute unit.

"Graph"—a collection of nodes connected by edges. Nodes may represent various kinds of items or operations, dependent on the type of graph. Edges may represent relationships, directions, dependencies, etc.

"IC"—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

"LUT"—lookup table.

"ML"—machine learning.

"MPE"—memory power estimator.

"PBU"—power base unit—a combination of a switch, a memory unit, and a compute unit including one or more power estimators.

"PCMC"—power clock management controller.

"PCU"—pattern compute unit—a compute unit that can be configured to repetitively perform a sequence of operations.

"PEU"—power estimation unit.

"Pipeline"—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level (typically a sequence of logical operations that are to be repetitively executed) that enables correct timing and loop control of node-level operations of the configured graph. Gate-level pipelines are usually hard wired and unchangeable, whereas meta-pipelines are configured at the CGR processor, CGR array level, and/or GCR unit level.

"Pipeline Stages"—a pipeline is divided into stages that are coupled with one another to form a pipe topology.

"PMU"—pattern memory unit—a memory unit that can locally store data according to a programmed pattern.

"SIMD"—single-instruction multiple-data—an arithmetic logic unit (ALU) that simultaneously performs a single programmable operation on multiple data elements delivering multiple output results.

"SPE"—switch power estimator.

"TLN"—top-level network.

Implementations

AI and Machine Learning Processors

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNext, RCNN, YOLO, SqueezeNet, SegNet, GAN, BERT, ELMo, USE, Transformer, and Transformer-XL.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be, or include, a computer such as further described with reference to FIG. 2. Host 180 runs runtime processes, as further referenced herein, and may also be used to run computer programs, such as the compiler 160 further described herein with reference to FIG. 7. In some implementations, the compiler may run on a computer that is similar to the computer described with reference to FIG. 2, but separate from host 180.

CGR processor 110 may accomplish computational tasks by executing a configuration file 165 (for example, a PEF file). For the purposes of this description, a configuration file corresponds to a dataflow graph, or a translation of a dataflow graph, and may further include initialization data. A compiler 160 compiles the high-level program to provide the configuration file 165. Runtime processes 170 may install the configuration file 165 in CGR processor 110. In some implementations described herein, a CGR array is configured by programming one or more configuration stores with all or parts of the configuration file 165. A single configuration store may be at the level of the CGR processor 110 or the CGR array 120, or a CGR unit may include an individual configuration store. The configuration file 165 may include configuration data for the CGR array 120 and CGR units in the CGR array 120, and link the computation graph to the CGR array 120. Execution of the configuration file by CGR processor 110 causes the CGR array 120 to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable data processing stages.

Each stage in PCU 520 may also hold one or more registers (not drawn) for short-term storage of parameters. Short-term storage, for example during one to several clock cycles or unit delays, allows for synchronization of data in the PCU pipeline.

Power Management

FIG. 6 illustrates an example architecture 600 with a distributed power information network. Architecture 600 includes an array of power base units (PBUs), each comprising a combination of a switch and an FCMU or a combination of a switch, a memory unit (such as a PMU) and a compute unit (such as a PCU). The array is similar to the arrays shown in FIGS. 3-4. The array includes a power information network 650 (or databus or other dedicated wiring to transfer power information) and may additionally include an ALN (not shown in FIG. 6). Each PBU estimates the nominal dynamic power usage for the switch, memory unit, and compute unit, based on a nominal clock frequency and a nominal supply voltage. Each PBU digitally communicates, via the dedicated wiring or the array-level power information network, its total estimated nominal dynamic power usage to an array-level power accumulator 630, for example including a power estimation unit (PEU 635) and additional power accumulators, such as column power accumulators (CPAs 620) or row power accumulators (RPAs).

Each PBU 610 may include a small local network that conveys and synchronizes power information from a switch power estimator (SPE) to a memory power estimator (MPE), and from the MPE to a compute power estimator (CPE). The local network may allow using low-interconnect layers, unburdening the higher interconnect layers in the IC, which are needed mostly for global data transfers. The small local network is coupled with (or part of) power information network 650. An advantage of having the dedicated power data network of architecture 600 is its high speed. Because the power data network synchronizes all power estimates, it can also provide an excellent estimate of peak power levels, rather than just averages. This significantly helps prevent timing errors caused by fluctuating power levels. Each PBU 610 conveys nominal dynamic power data to a CPA, which adds all power numbers in the column, and transmits it horizontally to peer CPAs, eventually coming together in the CPAs 620 which adds the power numbers of all columns.

In some implementations, each PBU conveys nominal dynamic power data to other PCUs in the row, where it eventually ends in a row power accumulator (RPA), which adds all power numbers in the column, and transmits it vertically to peer RPAs, eventually coming together in the PEU, which adds the power numbers of all rows.

Architecture 600 communicates nominal dynamic power usage estimates, independent of the IC's current supply voltage levels and independent of the current clock speed. PEU 635 may transmit its result to a power clock management controller (PCMC 640) or other power management unit. PCMC 640 receives the estimated nominal dynamic power from the PEU 635, and scales it with frequency and voltage scale factors that are based on the actual clock frequency and measured supply voltage to obtain an estimated actual dynamic power. It also estimates static power (leakage) for the array based on the measured supply voltage and the die temperature. PCMC 640 adds the dynamic power and static power estimates to obtain a total estimated power.

PCMC 640 may read leakage information from a memory, for example a nonvolatile memory, and adjust the leakage information for the current temperature and supply voltage to obtain a static power estimate. It may then add the static power estimate to the dynamic power estimate obtained from correcting the information from PEU 635 for the current temperature, supply voltage, and clock speed. The resulting total power estimate allows PCMC 640 to adjust supply voltage(s) and clock frequencies accordingly to prevent functional failures long before the effects of an increased power usage would be measurable.

FIG. 7 illustrates an example power base unit (PBU 700). PBU 700 includes a switch 710 that is coupled with, for example, an ALN 712, a memory unit, for example memory unit 720, and a compute unit, for example compute unit 730 or a compute unit in a neighboring PBU. PBU 700 further comprises a switch power estimator (SPE 715), a memory power estimator (MPE 725), and a compute power estimator (CPE 735). Memory unit 720 and compute unit 730 may jointly be part of an FCMU 740. Switch 710 may couple, via ALN 712, with one or more switches of neighboring PBUs, one or more memory units (for example memory unit 720, and one or more compute units. SPE 715 is coupled with switch 710, for example via a local connection. MPE 725 is coupled with SPE 715 and memory unit 720. CPE 735 is coupled with MPE 725 and compute unit 730, and further with power information network 750.

FIG. 8 illustrates details of a power base unit 800 implementation. Power base unit 800 monitors vector data switch activity to improve power estimation accuracy. Power base unit 800 includes a switch 810, a PMU 820, and a PCU 830. Switch 810 includes, or is coupled with, SPE 815. PMU 820 includes, or is coupled with, MPE 825, and PCU 830 includes, or is coupled with, CPE 835. CPE 835 is coupled with power information network 850. A switch uses relatively little power, and its dissipation can be accurately estimated from its port activity. Therefore, SPE 815 may measure the switch 810 port activity and transmit to MPE 825 a power estimate that is proportional or otherwise related to the switch port activity. SPE 815 may add a timestamp to the estimate to facilitate synchronization. It may make and/or transmit the estimate in response to a synchronization signal from MPE 825. Hence, there may be, for example, one bit of synchronization information flowing from MPE 825 to SPE 815, and six bits of power data information flowing from SPE 815 to MPE 825.

CPE 835 measures activity of the one or more SIMDs included in PCU 830 (or ALUs or other processor elements in a compute unit). A SIMD is a type of parallel processor that executes a single instruction on multiple data. The SIMD may have a configuration input that receives, for example, an opcode that determines the instruction type. It may have multiple A inputs for multiple different data to simultaneously operate on, and a B input to receive a common operand. An instruction may be to multiply the multiple data at the A inputs with the common operand (coefficient) on the B input, such as 'multiply all A inputs with B'. The power dissipated in a SIMD may depend on its internal architecture, and may include factors such as an idle power, power dependent on the operation being performed, power dependent on the number of operand bits being toggled since a previous (clock) cycle, and power dependent on whether one of the operands A or B equals zero. For example, a multiplication in which the B inputs receives the zero operand may not use any dynamic power. A multiplication in which one of the A operands equals zero may not use any dynamic power in the channel of that A operand. Zero-value monitoring is of particular importance for matrix multiplication, one of the most common operations in neural networks. By monitoring both the data switch activity (bits toggling), the value of the operands (zero values), and the type of operation, CPE 835 may calculate a quite accurate estimate of the power calculated in the SIMD. PCU 830 may include a pipeline of SIMDs operating on the input data, with successive SIMDs configured for a series of successive operations. Thus, CPE 835 may monitor each of the SIMDs, and may monitor all or part of the data channels that enter PCU 830, to get a comprehensive estimate of the power dissipation. CPE 835 may include separate circuits for monitoring bit toggling activity, and data values. It may further include a lookup table (LUT) to retrieve power values or power functions (or more generally: one or more energy parameters) for the various operations of which the SIMDs are capable. It calculates the resulting total power estimate for PCU 830, and adds estimates received from SPE 815 and MPE 825. It may provide a timestamp for the estimate, and may ensure that the timestamp matches timestamps provided by SPE 815 and MPE 825, so that all estimates are synchronized. CPE 835 may communicate the results to the system via the power network, ensuring that power estimates are available on a chip or system level much faster than other methods might be able to. Some implementations may use timestamps only locally within each power base unit, utilizing known network latency of the global power data network to ensure synchronization. In those applications, the PCU is responsible for power data synchronization. Other implementations may also the timestamps globally, so that CPE 835 transmits timestamped power data to the PEU. In those implementations, each the PCU, the CPA or RPA, and the PEU are responsible for power data synchronization.

CPE 835 may estimate the nominal dynamic power of PCU 830 as follows:

$$P_{pcu} = \alpha * \sum\nolimits_{M=i} (Ji * f(\text{in\_a}, \text{in\_b})) * \frac{eni*ni}{N*Tcycle} + \beta \qquad (1)$$

where:

$$f(\text{in\_a}, \text{in\_b}) = 1 + \gamma * (g(\text{in\_a}, \text{in\_b}) - ref)/ref \qquad (2)$$

$\gamma$ and ref are programmable constants, $$g(\text{in\_a}, \text{in\_b}) = (\min(\max(tg(\text{in\_a}), tg(\text{in\_b}), \text{base}), \text{ceil}) \qquad (3)$$

tg(x) is the data bit toggle count out of 64 bits; and base and ceil are programmable constants.

MPE 825 measures both write activity and read activity on the memory and supporting memory logic in PMU 820, and may further monitor vector data switch activity. Like CPE 835, MPE 825 may include separate circuits for monitoring bit toggling activity (a toggle monitor), and data values. In some implementations, MPE 825 and CPE 835 share a toggle monitor. The estimate depends on the type of memory used and on memory architecture details, and may include power while the memory is idle, average write power, impact of the data on the write power, average read power, and impact of the data on the read power. MPE 825 may monitor part or all of the data that enters or leaves PMU 820, and use a lookup table (LUT) to convert the monitored partial results into estimates, which it adds before transmitting to CPE 835. It may make and/or transmit the estimate in response to a synchronization signal from CPE 835. The transmitted estimate may further include a timestamp, and power data from SPE 815 with the same timestamp. Hence, there may be, for example, one bit of synchronization information flowing from CPE 835 to MPE 825, and eight bits of power data information flowing from MPE 825 to CPE 835.

MPE 825 may estimate the nominal dynamic power of PMU 820 as follows:

$$Ppmu = P_{wr} + P_{rd} + P_{idle} \qquad (4)$$

$$P_{wr} = (k_{wr} * f2(\text{data}) + 1) * \sum_{bank} \frac{f1(\text{data}) * P_{sram_{wr}} * n_{wi}}{N} \qquad (5)$$

$$P_{rd} = (k_{rd} * f3(\text{data}) + 1) * \sum_{bank} \frac{P_{sram\_rd} * n_{ri}}{N} \qquad (6)$$

Herein, f1, f2, and f3 are data-dependence scaling factors for SRAM write, write logic and read logic.

$$f(\text{data}) = 1 + k * (g(\text{data}) - ref) \qquad (7)$$

k and ref are programmable constants. SRAM write, write logic, and read logic have their own coefficients $k_{w1}$, $k_{w2}$, $k_r$.

$$g(\text{data}) = \min(\max(tg(\text{data}), \text{base}, \text{ceil}) \qquad (8)$$

tg(data) is the data toggle rate, and base and ceil are programmable constants.

SPE 815 is similar to MPE 825 and CPE 835. It includes a power LUT, a switch port activity monitor and power calculation logic. The power LUT lists the power of input and output ports when they are active. The power numbers in the power LUT may be based on the typical data activity of an application. SPE 815 may (or may not) have a data toggle monitor to minimize the hardware resources.

FIG. 9 illustrates details of an example CPE for nominal dynamic power estimation in a PCU 900. PCU 900 includes a pipeline of N+1 SIMD stages (or other ALU or processor core stages), including an initial stage 0 and stages 1 through N. The various stages may have equal or different capabilities. The stages may include multiple lanes, and CPE 910 shows the circuits needed for each such lane to estimate its power. The stages may be statically configured, for example by information in a configuration register 911, or dynamically configured, for example by information in an instruction register. If the PBU is included in a GPU, then GPU cores may dynamically fetch instructions (dynamic functionality information) from memory and place the current instruction in an instruction register. If the PBU is included in a CGR processor, then reconfigurable units may include a configuration register in which the static functionality information for each of the stages is stored. The configuration register or instruction register provides functionality information for each of the stages, as well as for the power calculation unit 912. An activity monitor 913 determines if each stage is active, and provides the activity information to power calculation unit 912. The toggle monitor 914 determines data related information, such as the amount of toggling, zero values, and any other data activity parameters known to impact power usage, and provides that information to power calculation unit 912.

Power calculation unit 912 uses the stages' activity information from activity monitor 913 and the functionality configuration from configuration register 911 to look up power information for each stage in the power LUT 915. Power calculation unit 912 uses a power usage model of a stage to calculate (estimate) the power usage based on the information from configuration register 911, activity monitor 913, toggle monitor 914, and power LUT 915.

CPE 910 includes a local power information network interface 916 to communicate with the MPE and/or SPE, and it synchronizes receive switch and memory unit power data with the stage power calculated by power calculation unit 912. Power calculation unit 912 adds the SPE and MPE power estimates to the estimate of the stages' power to obtain a total estimated nominal dynamic power for the PBU.

CPE 910 further includes an array-level power information network interface input 917 and an array-level power information network interface output 919. Some embodiments may, as drawn, receive power information from CPEs higher in the column in power information network interface input 917, add the total estimated power to the received power information in adder 918, and transmit the accumulated estimated power to a CPE lower in the column via power information network interface output 919. Other implementations may just pass the received power information on via power information network interface output 919 and transmit the total estimated power, leaving the accumulation to the column's CPA.

Power calculation unit 912, local power information network interface 916, power information network interface input 917, and power information network interface output 919 may all operate with timestamps to ensure that data of the SPEs, MPEs, CPEs is aligned with similar data from elsewhere in a column, thereby preventing that activity spikes get lost due to filtering effects.

FIG. 10 illustrates details of an example memory power estimator (MPE 1000) for nominal dynamic power estimation in an MPU. As shown, an MPE implementation can be rather similar to a CPE implementation. For each parallel lane of information being processed, MPE 1000 may include a power calculation unit 1010, a configuration register 1011 (or instruction register), a toggle monitor 1012, a power LUT 1013, an upstream local power information network interface 1014, an adder 1015, and a downstream local power information network interface 1016. Configuration register 1011 stores configuration information which it provides to the MPU, as well as to power calculation unit 1010. Toggle monitor 1012 determines data related information, such as the amount of toggling, zero values, and any other data activity parameters known to impact power dissipation, and provides that information to power calculation unit 1010. Power LUT 1013 may store power information for any circuits included in the MPU. MPE 1000 may not have any array-level power information network interfaces, however, upstream local power information network interface 1014 connects to the SPE to receive SPE dynamic power estimates, and downstream local power information network interface 1016 connects to the CPE so that MPE 1000 can transmit its estimate of the nominal dynamic power in the SPE and the MPE, or the summed estimate of the nominal dynamic power in the SPE plus MPE. Based on the information from configuration register 1011, toggle monitor 1012, and power LUT 1013, power calculation unit 1010 calculates an estimate of the nominal dynamic power dissipation in the MPU, and provides the estimate to adder 1015, which adds the estimate to the estimate received from the SPE. The combined estimate is transmitted to the CPE.

FIG. 11 illustrates details of an example CPA 1100. The CPA is essentially a three-input adder 1110, which adds the power estimates from the column above, the column below, and the previous column (received from the previous column's CPA). CPA 1100 sends the accumulated result to the next column's CPA, and ultimately to the PEU. It may further include synchronization logic 1120 which reads timestamps received from the three inputs and synchronizes the received power estimates in synchronization FIFOs 1130.

FIG. 12 illustrates details of an example PEU 1200 that determines the array-level nominal dynamic power estimate. PEU 1200 has a first CPA input (left input) and a second CPA input (right input). PEU 1200 includes sample circuits 1210 coupled with the first CPA input and the second CPA input, two-input adder 1220 with its inputs coupled the outputs of sample circuits 1210, and a first averaging stage 1230 with a data input coupled with the output of adder 1220 and a configuration input coupled with the averaging window register 1235 output. The averaging window register 1235 is set by the PCMC. The second averaging stage 1240 has a data input coupled with the output of first averaging stage 1230 and a configuration input coupled with the averaging window register 1235 output. Its output provides the information for the PCMC. PEU module 110 accumulates the power from CPAs and sends the averaged power to the PCMC. The averaging window is controlled by PCMC. First, PEU 1200 samples the input data from the CPAs in sample circuits 1210. The sampled data goes through two stages of averaging logic. The first averaging stage 1230 calculates a mean average. First averaging stage 1230 calculates the averaged power in a range from nanoseconds to milliseconds, configured by the PCMC in averaging window register 1235. Second averaging stage 1240 calculates a moving average power, which it provides to the PCMC.

FIG. 13 illustrates details of an example PCMC 1300 that determines array-level total power estimate. The power information from the PEU is based on an estimate at a nominal clock frequency and supply voltage which may not coincide with the actual clock frequency and supply voltage. PCMC 1300 dynamically scales the PEU data with a frequency scale factor and a voltage scale factor to get the final dynamic power. PCMC 1300 also determines the leakage based on the chip temperature and voltage. Some implementations determine the leakage from a lookup table (LUT) with the measured supply voltage and the clock frequency as its input variables. Other implementations may calculate the leakage based on a leakage model, using the measured supply voltage and the temperature as its input variables. PCMC 1300 adds the final dynamic power and the leakage (static power) to obtain the final total power, which it provides at its output, for example for use by a dynamic frequency and voltage scaling (DFVS) controller.

PCMC 1300 includes multiplier 1310, multiplier 1320, adder 1330, frequency scale factor circuit 1340, voltage scale factor circuit 1350, and leakage circuit 1360. Multiplier 1310 has a data input coupled with a PCMC data input that may receive the final total power data calculated by the PEU, and a frequency scale factor input coupled with an output of frequency scale factor circuit 1340. Frequency scale factor circuit 1340 determines the frequency scale factor from the actual clock frequency. For example, if the PEU estimate is based on a nominal clock frequency of 1 GHZ and the actual clock frequency is 3.5 GHz, then the frequency scale factor may be 3.5. In some implementations, frequency scale factor circuit 1340 includes a LUT. In other implementations, frequency scale factor circuit 1340 performs a mathematical operation on the actual clock frequency signal at its input to determine the frequency scale factor for its output. Multiplier 1310 scales the power estimate from the PEU by multiplying the power estimate from the PEU with the frequency scale factor.

Multiplier 1320 has a data input coupled with the output of multiplier 1310 and a voltages scale factor input coupled with an output of voltage scale factor circuit 1350. Voltage scale factor circuit 1350 determines the voltage scale factor from the measured supply voltage. The voltage scale factor may not be proportional to the measured supply voltage and may be determined from a voltage scaling model. The voltage scaling model may be stored as a table in a LUT included in voltage scale factor circuit 1350. In some cases, the voltage scaling model may be implemented as a mathematical operation performed by voltage scale factor circuit 1350. Multiplier 1320 scales the power estimated received from multiplier 1310 by multiplying it with the voltage scale factor to obtain the total dynamic power.

Adder 1330 has a data input coupled with the output of multiplier 1320 and a leakage data input coupled with an output of leakage circuit 1360. The leakage power or static power of an integrated circuit is determined by its circuitry (which is fixed), the supply voltage available to the circuitry, and the die temperature. The supply voltage can be measured. The die temperature can be measured as well as estimated. In either case, leakage circuit 1360 receives the measured supply voltage and the measured or estimated die temperature as its input variables based on which it estimates the static power. For example, leakage circuit 1360 may include a LUT, or a circuit that performs a mathematical operation on the input variables. Adder 1330 adds the total dynamic power received from multiplier 1320 and the static power received from leakage circuit 1360 to obtain the total estimated power.

FIG. 14 illustrates an example method 1400 of estimating power dissipation in an array of compute units. The compute units are paired with memory units and switches in an array-level network. Method 1400 comprises:

Step 1410—in a switch power estimator (SPE), estimating a switch nominal dynamic power dissipation.

Step 1420—in a memory power estimator (MPE), estimating a memory unit nominal dynamic power dissipation.

Step 1430—in a compute power estimator (CPE), estimating a compute unit nominal dynamic power dissipation.

Step 1440—adding the switch nominal dynamic power dissipation, the memory unit nominal dynamic power dissipation, and the compute unit nominal dynamic power dissipation to obtain a power base unit (PBU) nominal dynamic power dissipation estimate.

Step 1450—communicating the PBU nominal dynamic power dissipation estimate to an array-level power accumulator.

Step 1460—in the array-level power accumulator, accumulating nominal dynamic power dissipation estimates of multiple PBUs in the array to compute an array-level estimated nominal dynamic power.

Step 1470—scaling the array-level estimated nominal dynamic power with a frequency scale factor based on an actual clock frequency and a voltage scale factor based on a measured supply voltage to obtain an estimated actual dynamic power.

Step 1480—adding an estimated static power based on the measured supply voltage and based on a die temperature to the estimated actual dynamic power to obtain a total estimated power.

Implementations offer:

dedicated low-cost hardware for each power base unit in the array to estimate its dynamic power with a very high bandwidth;

a method of using a power lookup table and SIMD activity monitor to estimate the power dissipated in the power base units;

a novel technique of monitoring vector data switch activity to improve power estimation accuracy;

detection of zero values in matrix multiplication input data to improve power estimation accuracy for sparse matrices;

a dedicated low-cost, high-bandwidth network to collect synchronized power data from distributed units for fast chip-level power estimation;

use of PBU internal routing (i.e., lower level interconnect layers in an IC) as part of the power information network to minimize top-level interconnects; and a hybrid local and global bus for the power network to minimize top-level interconnects.

Particular Implementations

Described implementations of the subject matter can include one or more features, alone or in combination.

For example, in a first implementation, an integrated circuit comprises: multiple power base units (multiple PBUs) arranged in an array of rows and columns, wherein a PBU includes a switch, a memory unit, a compute unit, a switch power estimator (SPE), a memory power estimator (MPE), and a compute power estimator (CPE); dedicated wiring coupling the multiple PBUs with an array-level power accumulator; and a power clock management controller (PCMC) coupled with the array-level power accumulator; wherein: the SPE is configured to estimate a nominal dynamic power dissipated in the switch; the MPE is configured to estimate a nominal dynamic power dissipated in the memory unit; the CPE is configured to estimate a nominal dynamic power dissipated in the compute unit; the array-level power accumulator is configured to calculate an array-level nominal dynamic power estimate; and the PCMC is configured to scale the array-level nominal dynamic power estimate with a frequency scale factor and/or a voltage scale factor, and to add a static power estimate to obtain a total power estimate.

The foregoing and other described implementations can each, optionally, include one or more of the following features:

(2) the CPE is configured to monitor input data bit toggling, instruction type, and processing activity of one or more reconfigurable data processing stages included in the compute unit.

(3) the CPE is configured to determine a PBU total estimated nominal dynamic power dissipation by adding the estimated nominal dynamic power dissipated in the switch, the estimated nominal dynamic power dissipated in the memory unit, and the estimated nominal dynamic power dissipated in the compute unit, and to communicate the PBU total estimated nominal dynamic power dissipation to the array-level power accumulator via the dedicated wiring. Feature (3) may be combined with feature (2).

(4) the MPE is configured to monitor input data bit toggling and read and write activity in the memory unit. Feature (4) may be combined with any of the features (2)-(3).

(5) the SPE is configured to monitor switch port activity. Feature (5) may be combined with any of the features (2)-(4).

(6) the SPE, MPE, and CPE each add a timestamp to their respective nominal dynamic power dissipation estimates; and the PBU total estimated nominal dynamic power dissipation is calculated from estimates with matching timestamps. Feature (6) may be combined with any of the features (2)-(5).

(7) the array-level power accumulator further comprises a power estimation unit (PEU) including a first averaging stage, a second averaging stage, and an averaging window register, wherein the first averaging stage calculates a mean average, the second averaging stage calculates a moving average, and the averaging window register is configured to store data determining an averaging window for the first averaging stage and the second averaging stage. Feature (7) may be combined with any of the features (2)-(6).

(8) the array-level power accumulator further comprises a column power accumulator (CPA) configured to determine a column total estimated dynamic power dissipation in a column of PBUs; and to communicate the column total estimated dynamic power dissipation in the column of PBUs to a power estimation unit (PEU). Feature (8) may be combined with any of the features (2)-(7).

(9) the CPA comprises a three-input adder with three inputs coupled with three CPA inputs via three synchronization FIFOs and synchronization logic operable to control the three synchronization FIFOs based on timestamps retrieved from signals on the three CPA inputs. Feature (9) may be combined with feature (8) and any of the features (2)-(7).

(10) the array-level power accumulator further comprises a row power accumulator (RPA) configured to determine a row total estimated dynamic power dissipation in a row of PBUs; and to communicate the row total estimated dynamic power dissipation in the row of PBUs to a power estimation unit (PEU). Feature (10) may be combined with any of the features (2)-(7).

(11) the CPE comprises (a) a power calculation circuit, configured to: receive functionality information for one or more reconfigurable data processing stages; receive activity information of the one or more reconfigurable data processing stages; receive data activity parameters; access a power lookup table (LUT) configured to store power information for the one or more reconfigurable data processing stages; estimate a nominal dynamic power dissipation of the one or more reconfigurable data processing stages by looking up power information related to the one or more reconfigurable data processing stages and based on the received functionality information; and adjust the estimated nominal dynamic power dissipation based on the received activity information and the received data activity parameters; (b) a local network interface coupled with the power calculation circuit and configured to communicate with the SPE and the MPE; and (c) an interface coupled with the power calculation circuit and configured to communicate with the array-level power accumulator via the dedicated wiring. Feature (11) may be combined with any of the features (2)-(10).

(12) the CPE estimates nominal dynamic power in one or more reconfigurable data processing stages by looking up an energy parameter for an instruction type for the one or more reconfigurable data processing stages, and using the energy parameter along with a monitored zero-value operand and along with a number of toggled bits in input data. Feature (12) may be combined with any of the features (2)-(11).

(13) the MPE estimates nominal dynamic power in the memory unit by monitoring read and write activity in the memory unit; and adjusts the estimated nominal dynamic power in the memory unit for monitored bit toggling in memory input data or memory output data. Feature (13) may be combined with any of the features (2)-(12).

(14) the PCMC comprises: a first multiplier with a first data input and a frequency scale factor input, wherein the first data input is coupled with a PCMC data input, and wherein the frequency scale factor input is coupled with a frequency scale factor circuit configured to determine a frequency scale factor from an actual clock frequency; a second multiplier with a second data input and a voltage scale factor input, wherein the second data input is coupled with an output of the first multiplier, and wherein the voltage scale factor input is coupled with a voltage scale factor circuit configured to determine a voltage scale factor from a measure supply voltage; and an adder with a third data input and a leakage data input, wherein the third data input is coupled with an output of the second multiplier, and wherein the leakage data input is coupled with a leakage circuit configured to determine an estimated static power from a measured supply voltage and a die temperature. Feature (14) may be combined with any of the features (2)-(13).

Further or Additional Considerations

We describe various implementations of a high-bandwidth power estimator for AI accelerators.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to specific implementations thereof, these specific implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above. For example, although the figures focus on implementations that determine accumulated column powers that are forwarded to a power estimation unit (PEU), other implementations determine accumulated row powers that are forwarded to a PEU. Many operations in the presented circuits may be performed by table lookups and implemented as lookup tables (LUTs). However, the same operations could be performed by dedicated processing elements that are hardwired, and in some cases, operations can be performed by a reconfigurable (but dedicated) processor.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to specific implementations thereof, these specific implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

Thus, while specific implementations have been described herein, latitudes of modification, various changes, and substitutions are intended in the foregoing disclosures, and it will be appreciated that in some instances some features of specific implementations will be employed without a corresponding use of other features without departing from the scope and spirit as set forth. Therefore, many modifications may be made to adapt a particular situation or material to the essential scope and spirit of the technology disclosed.

What is claimed is:

1. An integrated circuit (IC), comprising:
an array of power base units (PBUs) arranged in rows and columns;
an array-level power accumulator, including:
a power estimation unit (PEU); and
two or more column power accumulators (CPAs), coupled, via dedicated wiring, with an output of a PBU in its respective column and with the PEU; and
a power clock management controller (PCMC) coupled with the array-level power accumulator;
wherein:
at least part of the CPAs is coupled with the array-level power accumulator via the dedicated wiring.

2. The integrated circuit of claim 1, wherein the PBU includes:
a switch;
a memory unit;
a compute unit;
a CPE coupled with the compute unit and with the dedicated wiring;
an MPE coupled with the memory unit and with the CPE; and
an SPE coupled with the MPE and the switch;
wherein the switch is coupled with at least one of the memory unit and the compute unit.

3. The integrated circuit of claim 2, wherein the CPE includes:
a power calculation unit;
a bit toggle monitor coupled with an input of the power calculation unit;
a configuration register coupled with an input of the power calculation unit;

an activity monitor coupled with an input of the power calculation unit;

a power lookup table (LUT) coupled with the power calculation unit; and one or more interfaces coupled with the power calculation unit and with the dedicated wiring.

4. The integrated circuit of claim 2, wherein the MPE includes:

a power calculation unit;

a bit toggle monitor coupled with an input of the power calculation unit;

a configuration register coupled with an input of the power calculation unit;

a power LUT coupled with the power calculation unit; and one or more interfaces coupled with the power calculation unit and with the dedicated wiring.

5. The integrated circuit of claim 1, wherein a CPA includes:

a first FIFO (first-in first-out register), configured to receive and synchronize first dynamic power estimates from a first part of a column;

a second FIFO, configured to receive and synchronize second dynamic power estimates from a second part of the column;

a third FIFO, configured to receive and synchronize accumulated dynamic power estimates from a previous column;

an adder with a first input coupled an output of the first FIFO, a second input coupled with an output of the second FIFO, and a third input coupled with an output of the third FIFO, and configured to accumulate the received and synchronized accumulated dynamic power estimates, first dynamic power estimates, and second dynamic power estimates; and synchronization logic coupled with the first FIFO, the second FIFO, and the third FIFO, and configured to read received timestamps and control the first FIFO, the second FIFO, and the third FIFO based on the received timestamps.

6. The integrated circuit of claim 1, wherein the PEU includes:

a first CPA input coupled with an output of a first CPA;

a second CPA input coupled with an output of a second CPA;

a first sample circuit with an input coupled with the first CPA input;

a second sample circuit with an input coupled with the second CPA input;

an adder with a first input coupled with an output of the first sample circuit and with a second input coupled with an output of the second sample circuit;

a first averaging stage with a first-stage averaging input coupled with an output of the adder, wherein the first averaging stage is configured to calculate a mean average;

a second averaging stage with a second-stage averaging input coupled with an output of the first averaging stage, wherein the second averaging stage is configured to calculate a moving average; and an averaging window register with an output coupled with a first-stage configuration input and with a second-stage configuration input, wherein the averaging window register is configured to be set by the PCMC.

7. The integrated circuit of claim 1, wherein the PCMC includes:

a PCMC data input configured to receive a power estimate from the PEU, wherein the power estimate is based on a nominal clock frequency and a nominal supply voltage;

a clock frequency input;

a frequency scale factor circuit coupled with the clock frequency input, wherein the frequency scale factor circuit is configured to output a power scaling factor based on a ratio between an actual clock frequency and the nominal clock frequency;

a supply voltage input;

a voltage scale factor circuit coupled with the supply voltage input, wherein the voltage scale factor circuit is configured to output a power scaling factor based on a ratio between an actual supply voltage and the nominal supply voltage;

a temperature input;

a leakage circuit coupled with the supply voltage input and the temperature input, wherein the leakage circuit is configured to output a leakage power estimate based on the actual supply voltage and an actual temperature;

a first multiplier with a first input coupled with the PCMC data input and a second input coupled with an output of the frequency scale factor circuit;

a second multiplier with a first input coupled with an output of the first multiplier and a second input coupled with an output of the voltage scale factor circuit; and an adder with a first input coupled with an output of the second multiplier and a second input coupled with an output of the leakage circuit.

* * * * *